Dec. 14, 1926.
A. C. HOPKINS
1,611,146
BEAD FOR PNEUMATIC TIRES AND REENFORCING ELEMENT THEREFOR
Filed August 15, 1925
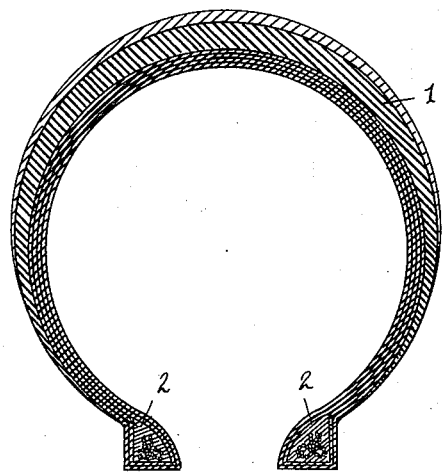
Fig. 1.
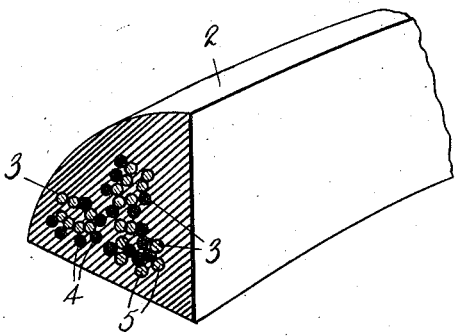
Fig. 2.
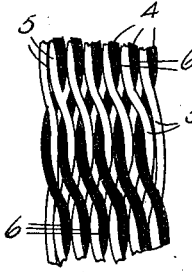
Fig. 4.
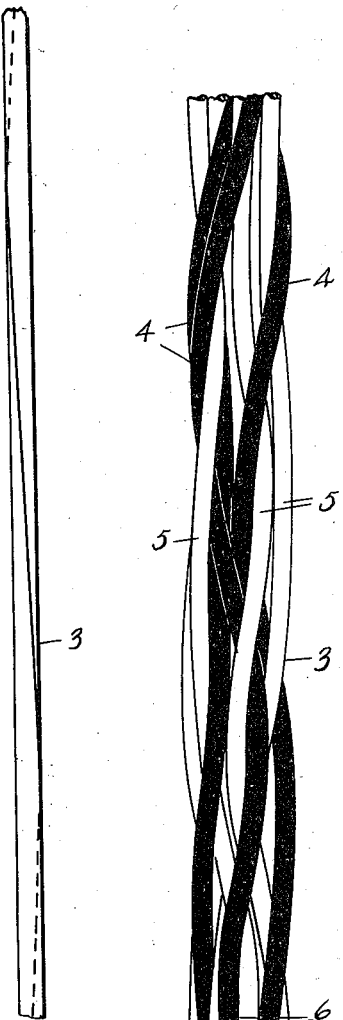
Fig. 5.
Fig. 3.
INVENTOR
Arthur C. Hopkins
BY
Chappell Earl
ATTORNEYS Patented Dec. 14, 1926.

1,611,146

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

BEAD FOR PNEUMATIC TIRES AND REENFORCING ELEMENT THEREFOR.

Application filed August 15, 1925. Serial No. 50,514.

This invention relates to improvements in beads for pneumatic tires and reenforcing elements therefor.

The main objects of this invention are:

First, to provide an improved bead for pneumatic tires which is adapted for use in the manufacture of tires by different methods or processes, including the "Hartford" process, or other processes requiring a rolling or turning movement.

Second, to provide an improved tire reenforcing element which is substantially non-stretchable longitudinally and in which substantially the full tensile strength of the strands is available.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Fig. 1 is a cross-section of a pneumatic tire embodying the features of my invention;

Fig. 2 is a fragmentary perspective view of a tire bead embodying the features of my invention, alternate strands of the reenforcing element being shown in black for convenience in illustration;

Fig. 3 is an enlarged fragmentary view of my improved tire bead reenforcing element;

Fig. 4 is a fragmentary view illustrating the braided or interlocking relation of the strands in the flat; and Fig. 5 is a conventional illustration of the spiraling of the strip shown in Fig. 4 which results in the cable-like form shown in Fig. 3.

In the drawing similar reference numerals indicate similar parts in all of the views.

Referring to the drawing, in Fig. 1 the tire casing 1 is shown conventionally adapted to receive the usual bead 2 which is in pratice of a suitable rubber composition with the reenforcing element designated generally by the numeral 3 embedded therein. In the embodiment illustrated the reenforcing element is given three coils or wraps.

This reinforcing element is formed of strands of wire which for convenience in illustration are designated as alternate black and white strands 4 and 5, respectively. It will be understood that these strands are of the same material and the color is used for the purpose of illustrating the relation of the strands in the element.

The strands 4 and 5 are bonded together by successively looping each strand back and forth with the adjacent strands at the sides thereof, as clearly shown in Fig. 4, the reaches of the strands being relatively long and the reaches of co-engaging strands being disposed in superimposed crossed contacting relation. The co-engaging bights of the strands are disposed in alinement from edge to edge of the strip and also in contact, as indicated at 6. The strands thus bonded are spirally twisted, as indicated in Fig. 5, the general position of the strands being indicated in Fig. 3. In the manufacture of the element the strands 4 are looped around the coacting strands 5 by means of continuously rotating spool or bobbin carriers, which produces a torsion in these strands 4, resulting in a spiral folding or twisting of the several looped strands. While in this form the element is "killed", as will be understood by those skilled in this art.

The braiding operation sets up torsional twisting stresses in certain of the strands so that they tend to twist spirally as conventionally shown in Fig. 5, resulting in the cable-like strand of Fig. 3. The reenforcing element being "killed" or "set" in this cable-like form maintains its form, that is, there is no substantial tendency for it to further twist or kink, or to unwrap. This spiraling further tends to equalize stresses within the strip so that the element may be very easily handled and placed in any desired position, and may be utilized in any of the well-known processes or methods of manufacturing tires with which I am familiar, including the processes which require rolling or turning.

A further advantage is that the full tensile strength of the strands is secured and there are no substantial shearing stresses on the strands.

Having thus described my invention what I claim as new and desire to secure by Letters Patent is:

1. An element of the class described comprising a plurality of strands of wire braided together with the several strands alternately and successively looped back and forth with adjacent strands with the bights of the corresponding loops alined and with the reaches of co-engaging loops in crossed relation so that each strand has direct looped bonding engagement with the strands at the sides thereof, the several bonded strands being spirally twisted to a cable-like form.

2. An element of the class described comprising a plurality of strands of wire bonded together by successively and alternately disposed co-engaging loops with the reaches of corresponding loops disposed in superimposed crossed relation, the bonded strands being spirally twisted to a cable-like form.

3. An element of the class described comprising a plurality of strands of wire braided together by alternately and successively looping the several strands back and forth with adjacent strands with the corresponding reaches of their loops in crossed relations, the braided strands being spirally twisted to cable-like form.

4. An element of the class described comprising a plurality of strands of wire braided together with the several strands alternately and successively looped back and forth with adjacent strands with the reaches of coacting loops in crossed relation and their corresponding bights in transverse alinement, the strands so bonded being spirally twisted.

5. An element of the class described comprising a plurality of wire strands, each strand being looped successively and alternately back and forth with the strands at the sides thereof, the strands so looped together being spirally twisted as a unit.

In witness whereof I have hereunto set my hand.

ARTHUR C. HOPKINS.